Nov. 15, 1949     E. J. OSTERHUS     2,487,826
PRESSURE AND VACUUM PUMPING UNIT LUBRICATION
Filed May 1, 1945                                4 Sheets—Sheet 1
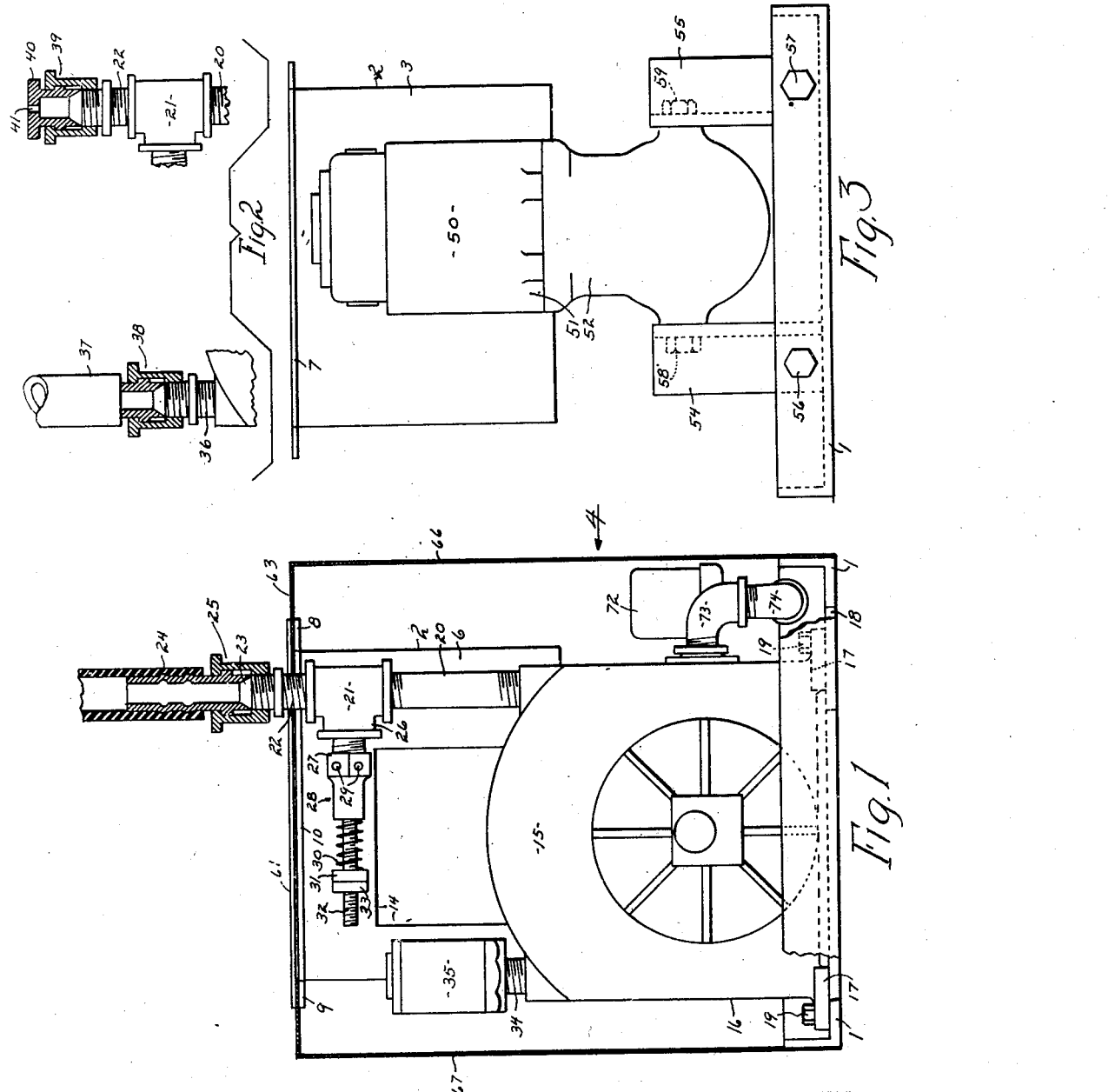
INVENTOR.
Ervin J. Osterhus
BY Harry R. Canfield
ATTORNEY Nov. 15, 1949     E. J. OSTERHUS     2,487,826
PRESSURE AND VACUUM PUMPING UNIT LUBRICATION
Filed May 1, 1945             4 Sheets-Sheet 2
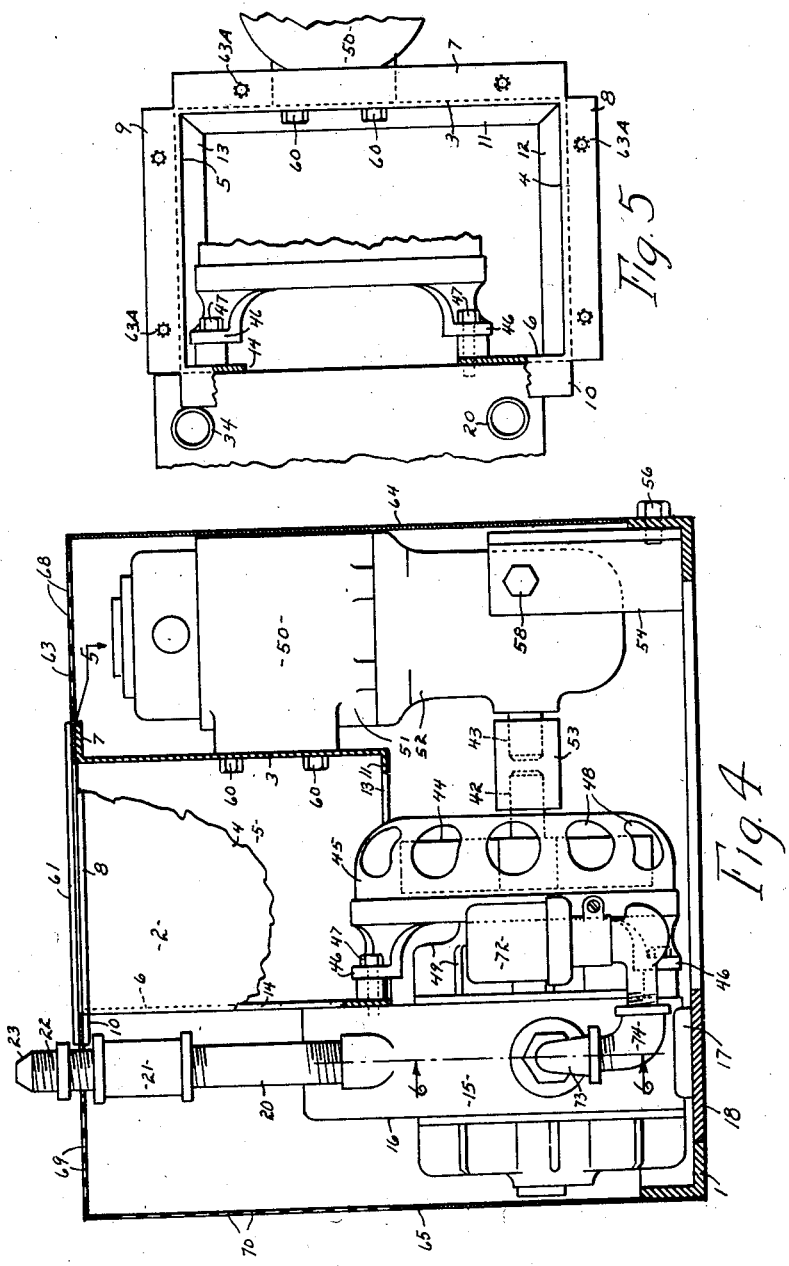
INVENTOR.
Ervin J. Osterhus
BY Harry P. Canfield
ATTORNEY Nov. 15, 1949 E. J. OSTERHUS 2,487,826
PRESSURE AND VACUUM PUMPING UNIT LUBRICATION
Filed May 1, 1945 4 Sheets-Sheet 3
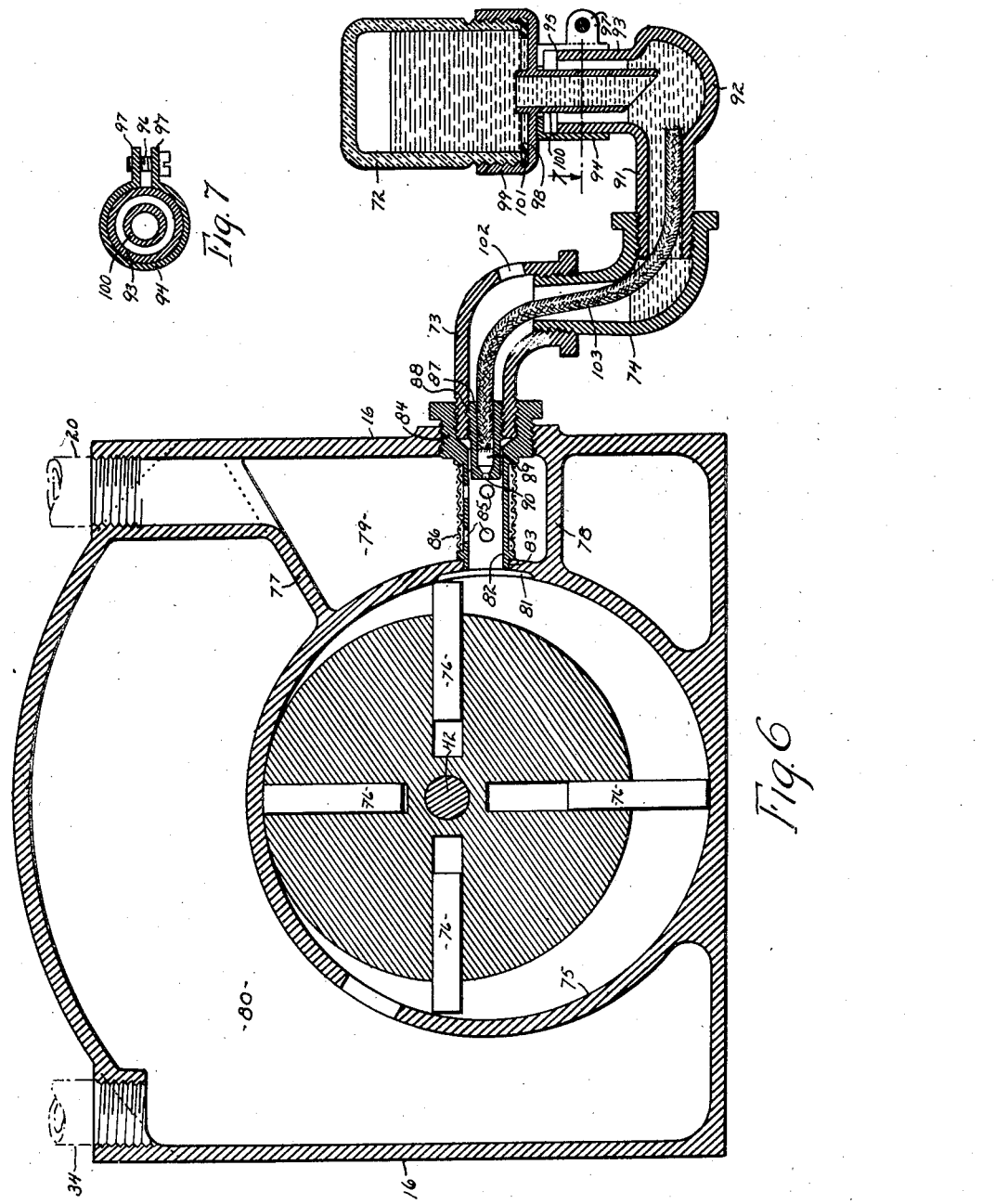
INVENTOR.
Ervin J. Osterhus
BY Harry P. Canfield
INVENTOR Nov. 15, 1949 E. J. OSTERHUS 2,487,826
PRESSURE AND VACUUM PUMPING UNIT LUBRICATION
Filed May 1, 1945 4 Sheets—Sheet 4

INVENTOR.
Ervin J. Osterhus
BY Harry R. Canfield
ATTORNEY

Patented Nov. 15, 1949

2,487,826

UNITED STATES PATENT OFFICE 2,487,826

PRESSURE AND VACUUM PUMPING UNIT LUBRICATION

Ervin J. Osterhus, Cleveland, Ohio, assignor, by mesne assignments, of thirty one-hundredths to Ralph R. Roemer, thirty-five one-hundredths to Louise E. Roemer, twenty-five one-hundredths to William R. Kiefer, and ten one-hundredths to J. Everette Tompkins, all of Cleveland, Ohio Application May 1, 1945, Serial No. 591,323

5 Claims. (Cl. 230—207)

This invention relates to apparatus for applying a flow of air under subatmospheric or superatmospheric pressure.

Such an apparatus as that embodying the present invention has many uses in various arts, but perhaps the most important use is in connection with the manufacture, inspection, adjustment, testing, etc. of aircraft apparatus of the type that is operated by a flow of air under pressure, or a flow of air under vacuum; and in order that a concrete disclosure of an illustrative embodiment of the invention may be made herein, an apparatus is illustrated and described in this specification and drawing particularly adapted to use with aircraft apparatus.

Among such aircraft apparatus operated by vacuum is the aircraft gyro vacuum system as a whole, and the gyro instruments and other component parts of the system, etc.; and among such aircraft apparatus operated by pressure is the de-icing boot system, etc.

It is among the objects of the invention:

To provide generally an improved construction of power operated, pumping unit for supplying air optionally at superatmospheric or subatmospheric pressure;

To provide a power operated air pumping unit having improved means for lubricating the pump;

To provide an air pumping, power operated unit provided with means actuated by vaccuum produced by a pump to supply lubricant to the pump whether it is pumping air at superatmospheric or subatmospheric pressure;

To provide a power operated air pumping unit comprising a pump for supplying either air vacuum or air pressure, and lubricated by means actuated by pump-produced vacuum when supplying vacuum, and having means for providing a predetermined degree of lubrication-actuating vacuum, when supplying air pressure;

To provide a power driven pumping unit for supplying vacuum or pressure to test aircraft apparatus, etc., the parts of which unit are compactly arranged in an improved manner to reduce the over-all size and weight of the unit and to render it conveniently portable into and out of an aircraft;

To provide a power driven pumping unit for supplying air vacuum or pressure, the parts of which are associated and assembled with an improved frame construction;

To provide a housing-enclosed motor-driven air-pumping unit for supplying air vacuum or pressure, and having an improved air-cooling system for the pump and motor thereof.

Other objects will be apparent to those skilled in the art to which the invention appertains.

The invention is fully disclosed in the following description taken in connection with the accompanying drawing, in which:

Fig. 1 is a rear and elevational view of an apparatus embodying the invention with parts in condition for supplying a flow of air under vacuum, some of the parts being shown in section and other parts in broken section for clearness;

Fig. 2 is a fragmentary view similar to a part of Fig. 1 with the parts in condition for supplying a flow of air under pressure, and illustrating an accessory device by which some vacuum is developed to actuate a pump lubricating apparatus;

Fig. 3 is a front elevational view of the parts of Fig. 1 but illustrating only a power supplying motor and certain frame elements by which it is supported, parts forwardly thereof and an enclosing container, being omitted to simplify the drawing;

Fig. 4 is a side elevational view of the apparatus of Fig. 1 taken in the direction of the arrow 4 of Fig. 1 with parts in section and parts in broken section for clearness;

Fig. 5 is a fragmentary top plan view of a boxlike frame element constituting part of the preceding figures, and the view may be considered as taken from the plane 5 of Fig. 4, and parts being broken away to simplify the drawing;

Fig. 6 is a sectional view taken from the plane 6—6 of Fig. 4 through a pump thereof, and with parts of a lubricating mechanism for the pump (which in Figs. 1 and 4 are positioned in a compact arrangement) rotated around into the section plane of Fig. 6 for purposes of clearer illustration;

Fig. 7 is a sectional view taken from the plane 7 of Fig. 6 with parts behind the section plane omitted for simplicity, to show more clearly a clamping device of Fig. 6;

Figure 8:
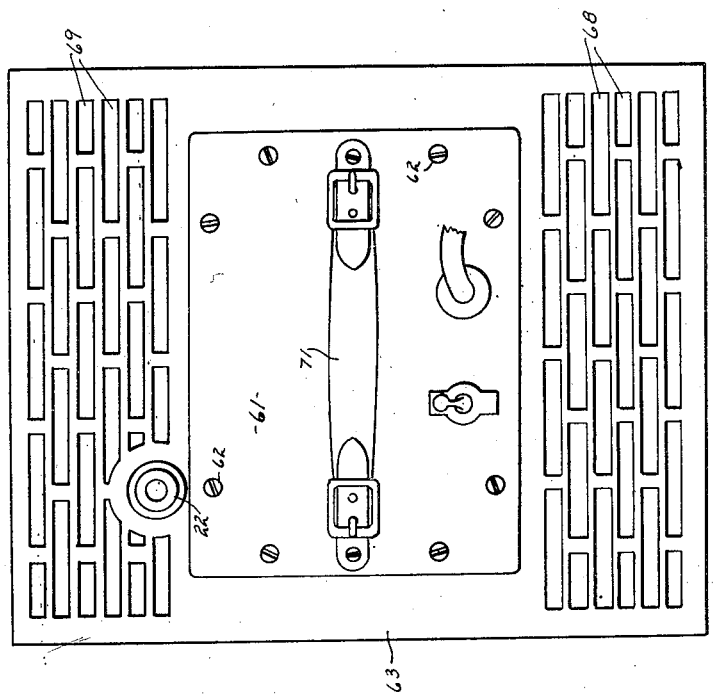
Fig. 8 is a top plan outside view of the apparatus as it appears within a container therefor.

Referring to the drawing, Figs. 1, 3, and 4 show a pressure and vacuum pumping unit having the parts thereof supported in general upon a rectangular base or frame 1, made from angle iron; and above the base 1 is a supplemental frame element 2 in the form of a rectangular box made from sheet metal, to which certain parts of the apparatus are secured and by which they are positioned and supported and on which certain parts ar mounted.

The upper end of this box-like frame 2 is open, see Figs. 4 and 5; and the front wall 3, side walls 4 and 5, and rear wall 6, have outwardly laterally extending flanges 7, 8, 9, and 10, respectively. The bottom of the box is also open, and has inwardly extending flanges 11, 12, and 13 on the front and side walls 3, 4, and 5. The rear wall 6 of the box has a large opening 14 therein, see Figs. 1 and 5. The box, as a frame element is made of sheet metal and rendered stiff by the said flanges. It will be referred to again later.

At the rear of the unit and shown generally at 15 is a pump, preferably of the rotary, positive displacement, eccentric, sliding vane type, as indicated generally and somewhat diagrammatically in Fig. 6. The pump housing 16 which entirely encloses its working parts, has feet 17—17 at the bottom thereof which rest upon the angle iron frame 1 (which includes a flange extension 18 welded to the angle iron) and they are secured thereto, for example, by bolts 19—19.

The pump 15 as viewed in Figs. 1 and 4 has an air flow inlet conduit 20, extending upwardly therefrom and at its upper end is a T-connection 21, into the outer end of which is screwed a connector 22 having a conical end 23 for making sealed connection with a vacuum hose 24 by a coupling 25 of standard type.

The side branch 26 of the T-connection 21 has threaded thereinto the head 27 of a vacuum relief valve construction 28. The exact construction of this relief valve is not essential to the present invention. Various constructions may be utilized. The one illustrated comprises intake relief ports 29 normally closed off by a valve not shown and held closed by a valve spring 30; and upon the occurrence of pump vacuum within the conduit 20 higher than a preselected value, the valve opens and relieves the vacuum through the ports 29. The spring 30 reacts upon the head 27 and upon a nut 31 on a stem 32 to hold the stem outwardly, the stem being connected to the valve. The vacuum at which the valve operates may be adjusted by adjusting the tension of the spring 30 by means of the nut 31 and locked by a lock nut 33, both of which may be screwed inwardly or outwardly along the threaded stem 32.

The pump 15 is also provided with an air outlet conduit 34 leading into a muffler 35 which absorbs or suppresses exhaust noise of the pump, and which also acts as a filter by which oil or other vapor which may be discharged from the pump may be filtered, and the entrained solid matter thereof caught thereby. The exact construction of this muffler-filter constitutes no essential part of the present invention, but is preferably one which has a threaded conduit 34 for screwing into the pump housing, and which can be cleaned and renewed conveniently. The muffler-filter 35 of Fig. 1 may conveniently be removed by screwing out the conduit 34 when the pump is to be used to pump pressure. When removed for this purpose, a hose connector 36 (see Fig. 2) is screwed into the pump housing in its place, and an air flow pressure hose 37 is coupled thereto by a coupling 38; and at the same time the vacuum hose coupling 25 and vacuum hose 24 of Fig. 1 are removed, and in their place are substituted (see Fig. 2) a coupling 39 and a plug 40, which latter closes the flow to the connector 22 except for a small hole 41 in the plug; whereby when the pump is supplying air flow under pressure to the hose 37 (Fig. 2), some vacuum will be developed by the pump for lubricating purposes as will be described, the degree of this vacuum being preselected by preselecting the size of the hole 41.

The pump has a driving shaft 42 connected to its rotor (Figs. 4 and 6) mounted in suitable bearings associated with the pump but not shown, to avoid unnecessary drawings, and this shaft is coupled to a motor driven shaft 43 aligned therewith, Fig. 4.

On the pump shaft 42 is a ventilating or cooling fan 44. The cooling fan is surrounded by a fan housing 45 having feet 46 bolted by a suitable number of bolts, 47, to the rear of the pump housing; the upper two of these bolts passing through the above identified rear wall 6 of the above described box frame, and into the pump housing as shown in Figs. 4 and 5. Air inlet openings 48 are provided in the fan housing 45 through which cooling air enters, and the air is blown by the fan 44 upon cooling fins 49 on the rear of the pump housing 16 of Fig. 4.

A free flow passage for this cooling air is provided whereby the fan may efficiently develop large volume output, the air flowing rearwardly out of the fan housing 45, over the front side of the pump housing 16, upwardly through the open bottom of the box frame 2, Figs. 4 and 5, and rearwardly through the large opening 14 in the rear of the box frame, and over the top of the pump housing 16.

The pump is driven by an electric motor 50 having a main frame 51 and disposed with its rotary axis generally vertical and at right angles to the shaft 42 of the pump. A gear housing 52 is attached to the lower end of the motor frame 51 and in it are gears not shown but having the said output shaft 43 aligned with the pump shaft 42. A flexible coupling 53 connects the two shafts.

To support the weight of the motor frame 51 and gear housing 52, a pair of upright pieces of angle iron 54 and 55 are bolted at their lower end portions as at 56 and 57, Figs. 3 and 4, to the angle iron frame 1, and extend upwardly therefrom and along opposite sides of the gear housing 52 and at their upper end portions are bolted as at 58 and 59 to the gear housing.

The front wall 3 of the box frame and the frame 51 of the motor are bolted together as at 60, Figs. 4 and 5.

The box frame 2 will be seen, from the foregoing description, to hold the motor axis in vertical position and spaced correctly from the pump housing; and is itself held at a suitable elevation by being supported by the pump housing and motor frame; and, being of substantially rigid construction because of its form and its stiffening flanges referred to, constitutes an upper central frame by which the several parts connected to it are relatively positioned and secured.

The upper part of the box frame 2, particularly its upper flanges 7, 8, 9, and 10, also constitutes a support and positioning means for a sheet metal panel 61 secured thereto by screws 62; see Fig. 8, and screw holes 63A in Fig. 5; and the panel 61 is a part of the top wall 63 of an enclosing container for the entire apparatus, the front, rear, and side walls of the container being shown at 64, 65, 66, and 67.

The top wall 63 of the container apart from the panel 61, and the rear side wall 65 thereof have portions thereof, provided with perforations therein, as inlets and outlets to and from the container housing for the flow of the cooling air described above, the air entering perforations 68 in the top wall 63, and flowing over the motor 50, being directed to do so by the presence of the box frame 2 which acts as a partial partition or deflector therefor, and the air after flowing over the motor, flowing through the inlet openings or ports 48 of the fan housing, and thence as described, and out at perforations 69 and 70 in the top and front walls 63 and 65 respectively.

The box-form frame element 2 thus performs a function in connection with the cooling of the apparatus by the fan.

The container side walls extend downwardly to the angle iron frame 1.

A suitable carrying handle 71 is provided, on the panel 61, see Fig. 8, (this handle having been omitted from Figs. 1 and 4). The weight of the entire portable apparatus, when carried by the handle 61 is therefore supported by the box frame element 2 to which the panel 61 is attached, so that the box frame performs this additional function.

The structure of the pumping unit provides for actuating a lubricating means for lubricating the interior working parts of the pump.

As mentioned hereinbefore the apparatus of this invention is one which pumps a volumetric flow of air, and it may supply such flow of air at vacuum with the conduit connections of Fig. 1; or may supply it at pressure with the conduit connections of Fig. 2. It is desirable to supply lubricant to the pump interior in both cases, and means will now be described, for doing this, actuated by vacuum both when the pump is supplying air at vacuum and when supplying air at pressure.

Heretofore, as in some prior practice, the vacuum produced by a pump has been utilized to draw lubricant, such as oil, into the pump, but in all such arrangements of which I have knowledge, the amount of oil or rate of feeding of it to the pump, varies with the amount of vacuum drawing it in, and if the rate of lubricant feed is set so as to be sufficient at low pump vacuum it is excessive at high vacuum, and if it is set to be correct for high vacuum it is insufficient at low vacuum.

In other prior practice, pump lubricating oil has been supplied from a reservoir by a metering arrangement continuously supplying oil; drop by drop, at a measured rate; but in such cases the feeding of oil goes on, even after the pump is stopped and therefore will flood the pump and uselessly deplete the oil supply unless care is exercised to cut the feed on and off as the pump is used intermittently.

The vacuum actuated lubricator described below supplies oil to the pump at a constant, but adjustable rate at all times and independent of the degree of vacuum or pressure developed by the pump, and automatically ceases to be supplied when the pump stops pumping.

In Figs. 1 and 4 is shown at 72 a reservoir for lubricating oil, and at 73 and 74 two pipe elbows connecting between the reservoir and the pump housing 16. The elbows 73 and 74 are in these figures in different planes so as to dispose the reservoir 72 close to the rest of the apparatus, and provide a compact structure. For purposes of description, however, and referring to Fig. 6, the elbow 74 and reservoir 72 have been rotated into the same plane as the elbow 73, so that the entire lubricating apparatus can be more clearly shown in one figure, as in Fig. 6, and the following description is referred to Fig. 6.

The pump has a cylindrical chamber 75 against the wall of which the eccentrically supported pump vanes 76—76 engage in a well known manner as they rotate. The pump outer housing wall is shown at 16. Partitions 77 and 78 provide a vacuum chamber 79 with which the intake conduit connector 20 referred to communicates, and an output or pressure chamber 80 with which the filter conduit 34 communicates when the pump is supplying air flow under vacuum. The corresponding connections of Fig. 2 are made when the pump is supplying a flow of air under pressure and at a predetermined degree of vacuum in the vacuum chamber 79.

A recess 81 is provided at one point of the cylinder wall 75. A tube 82 extends into a bore 83 in the cylinder wall and communicates with this recess. The tube has an enlarged head 84 threaded into the outer wall 16 of the pump housing, the tube 82 having perforations 85 in its wall surrounded by a screen or like filter 86.

The pipe elbow 73 is threaded into the head 84. A plug 87 is screwed at one of its ends into the open end of the elbow 73 at 88, and at the other end projects into the tube 82. This plug has a bore 89 opening into the elbow 73 and at the opposite end is closed except for a small hole 90, which as an illustrative case, may be the size of a No. 50 drill.

The elbow 74 is threaded into the outer end of the elbow 73. Into the outer end of the elbow 74 is threaded a tubular shank 91 of an oil pot 92, the shank extending approximately horizontally.

The pot 92 has an upwardly extending neck 93. A tubular clamp 94 slotted at one side as at 95 is clamped around the neck 93 by a screw 96 and two ears 97 on the clamp, see also Fig. 7. A reservoir carrier is provided comprising a head 98 resting upon the clamp 94, a tubular internally threaded flange 99 extending upwardly from the head and an open tube 100 extending downwardly from the head and through the neck 93 and into the pot 92.

The oil reservoir 72 in the form of an inverted cup, and preferably being of glass to render it transparent so that the supply of oil therein may be inspected, is threaded at its lower end into the flange 99 and sealed on the head 98 at its downwardly open end by a gasket 101. The lower end of the tube 100 is preferably cut off at an angle as shown.

With the arrangement thus far described, oil in the reservoir 72 will flow into the pot 92, shank 91, and elbow 74, until it rises to the level of the lower end of the tube 100 as shown; and as oil is drawn out of the pot during operation to be described, oil is supplied to it from the reservoir 22, and the level is continuously maintained constant in a well known manner; and the height of the level may be adjusted by adjustably raising or lowering the tube 100 by raising or lowering the clamp 94.

The elbow 73 has a large hole 102, for example ¼ inch in diameter in its rear wall.

At 103 is an elongated piece of oil absorbing porous material; and because of the practicability, convenience and cheapness thereof, I prefer to use for this purpose a length of ordinary tobacco pipe cleaner, which as is well known comprises a central wire core surrounded by a mass of fibrous absorbent material. While other materials may be used for this purpose, pipe cleaner material is preferred and for convenience of description will hereinafter be referred to as pipe cleaner material.

The pipe cleaner material 103 extends from the bore 89 of the plug 87, through the elbows 73 and 74, into the shank 91, or through the shank and into the pot 92.

The apparatus is preferably assembled in the following manner. One end of the pipe cleaner material 103 is inserted into the bore 89 of the plug 87. The reservoir shank 91 and the two elbows 74 and 73 are all three screwed together. The free end of the pipe cleaner material 103 is then inserted into the small end of the elbow 73 and fed therethrough, and the plug 87 is then screwed into the elbow 73. The elbow 73 is then screwed into the tube head 86.

In operation, the lower end portion of the pipe cleaner material 103 always lies below the level of the oil in the shank 91 and therefore absorbs oil. By capillarity action the oil rises in and along the pipe cleaner material up into the elbow 73.

When the pump is working, vacuum is created within the chamber 79 and within the tube 82, and air flows in at the elbow opening 102 and flows over the oil-wet pipe cleaner material 103 and into and through the bore 89 of the plug 87, through the small hole 90 in the plug, and into the tube 82 and thence to the pump chamber 75.

The bore 89 in the plug and the outside diameter of the pipe cleaner material 103 are proportioned so that the presence of the pipe cleaner material in the bore does not prevent the flow of air or air and oil through the plug. This flow of air as described, picks up oil from the oil-wet pipe cleaner material 103 and carries it through the tube to the pump.

The hole 102 in the elbow 73 is so much larger than the hole 90 in the plug 87, that no appreciable vacuum develops in the elbow 73 regardless of how high a vacuum may be developed by the pump. One result of this is that there is a flow of air through the elbow 73 and over the oil-wet pipe cleaner material 103 in it, substantially at atmospheric pressure; and consequently the level of the oil in the shank 91 and pot 92 is not affected or changed thereby but remains constant at all degrees of pumped vacuum.

The length of that portion of the pipe cleaner material 103 above the oil level, is therefore constant, because the oil level is constant; and the force of capillarity being a constant, oil creeps up along that part of the pipe cleaner material 103 in the elbow 73 at a constant rate.

The flow of air through the elbow 73 and through the small hole 90 in the plug, even at low vacuum, would obviously be able to carry oil over into the pump at a high rate if there were a sufficiently ample supply, but it cannot carry it over at a rate greater than that at which the pipe cleaner material supplies it, which is at a constant rate, hence both at low and high vacuum the rate of oil supplied to the pump is constant.

Also, as will now be apparent, the rate of oil supplied to the pump can be adjustably changed when desired by adjustably changing the oil level as described. If the oil level is raised, the oil travelling up the pipe cleaner material 103 into the elbow 73 has a shorter distance to travel by capillarity, and hence covers this distance in a shorter time and therefore supplies oil at a higher rate.

As is believed to be clear from the foregoing, when the pump is supplying an air flow under main vacuum, with the connections of Fig. 1, the vacuum, effecting lubrication as described, is the main vacuum; and when the pump is supplying air flow under pressure with the connections of Fig. 2, the vacuum, effecting lubrication as described, is the degree of vacuum determined by the size of the hole 41 of the plug 40 of Fig. 2. The size of this hole 41 is not critical but is chosen to correspond to the maximum pressure developed by the pump when pumping pressure and to the proportions of the lubricating parts and the rate of oil feed wanted, all as will be understood by those skilled in the art.

The lubricating apparatus therefore supplies lubricating oil to the pump at a constant adjustable rate both when the pump is supplying an air flow under pressure or when it is supplying air flow under vacuum, and the rate being adjustable and independent of the degree of vacuum which in each case actuates the lubrication.

When the pump stops working, the vacuum actuating the lubricator disappears; and the pipe cleaner material remains oil-wet, but no oil is carried therefrom into the pump because the flow of air over it ceases. Means to cut off the oil supply is unnecessary.

In the use of the above described air pumping unit, to supply vacuum, and with the connections of Fig. 1, and when the apparatus supplied with vacuum is an aircraft apparatus, such for example as its gyro vacuum system, the pump draws air through and out of the said system; and develops vacuum because of restrictions to the air flow in the apparatus of the system itself.

When the pumping unit is used to supply air pressure, and with the connections of Fig. 2, the restriction afforded by the hole 41 in the plug 40, while not interfering with a sufficient flow of air for air pressure supply does develop sufficient vacuum at the vacuum side of the pump to actuate the lubricating apparatus as described.

Subject matter illustrated and described herein but not claimed is being claimed in the copending application of Carl F. Duerr, Jr., Serial No. 592,787, filed May 9, 1945, now Patent No. 2,460,814 issued February 8, 1949; and in the copending application Serial Number 773,479, filed September 11, 1947, which is divisional from the present application.

The invention is comprehensive of all changes and modifications which may be made therein by those skilled in the art, and which come within the scope of the appended claims.

I claim:

1. In a testing unit for supplying a flow of air under pressure or vacuum, to apparatus to be tested; a motor driven air pump having vacuum and pressure chambers at its air intake and output sides; air inlet means communicating with the vacuum chamber to which a flexible conduit may be connected to supply a flow of air under vacuum to apparatus to be tested; air outlet means communicating with the pressure chamber to which a flexible conduit may be connected to supply a flow of air under pressure to apparatus to be tested; air flow restricting means, and means to detachably connect the restricting means to the vacuum chamber in the line of flow through the air inlet means, when the pumping unit is supplying air under pressure, to develop a predetermined limited degree of vacuum in the vacuum chamber; and a lubricator for the pump comprising a reservoir of lubricant and means actuated by vacuum in the vacuum chamber to draw lubricant into the pump, to lubricate the pump both when it is supplying air vacuum and when it is supplying air pressure.

2. In a testing unit for supplying a flow of air under pressure or vacuum, to apparatus to be tested; a motor driven air pump having vacuum and pressure chambers at its air intake and output sides; air inlet means communicating with the vacuum chamber to which a flexible conduit may be connected to supply a flow of air under vacuum to apparatus to be tested; air outlet means communicating with the pressure chamber to which a flexible conduit may be connected to supply a flow of air under pressure to apparatus to be tested; air flow restricting means, and means to detachably connect the restricting means to the vacuum chamber in the line of flow through the air inlet means, when the pumping unit is supplying air under pressure, to develop a predetermined limited degree of vacuum in the vacuum chamber; and a lubricator for the pump comprising a reservoir of lubricant, and lubricant feed control means actuated by vacuum in the vacuum chamber to draw lubricant into the pump, at a constant rate independent of the degree of vacuum developed by the pump and at zero rate when the vacuum is discontinued, to lubricate the pump both when it is supplying air vacuum and when it is supplying air pressure.

3. In a testing unit for supplying a flow of air under pressure to apparatus to be tested, a motor driven air pump having air vacuum and pressure chambers at its air intake and output sides; air outlet means communicating with the pressure chamber to which a flexible conduit may be connected to supply a flow of air under pressure to apparatus to be tested; air flow restricting means and means to detachably connect the restricting means in the line of flow of the air to the vacuum chamber to develop a predetermined limited degree of vacuum therein; and a lubricator for the pump comprising a reservoir of lubricant and means actuated by said vacuum in the vacuum chamber to draw lubricant into the pump to lubricate it when supplying air pressure.

4. In a testing unit for supplying a flow of air under pressure to apparatus to be tested, a motor driven air pump having air vacuum and pressure chambers at its air intake and output sides; air outlet means communicating with the pressure chamber to which a flexible conduit may be connected to supply a flow of air under pressure to apparatus to be tested; air flow restricting means and means to detachably connect the restricting means in the line of flow of the air to the vacuum chamber to develop a predetermined limited degree of vacuum therein; and a lubricator for the pump comprising a reservoir of lubricant and lubricant feed control means actuated by said vacuum in the vacuum chamber to draw lubricant into the pump at a constant rate independent of the degree of vacuum developed by the pump and at zero rate when the vacuum is discontinued, to lubricate it when supplying air pressure.

5. In a pumping unit, a motor driven air pump having pressure and vacuum chambers in which pressure and vacuum respectively may be developed in the use of the pump, lubricant feeding means to lubricate the pump comprising a reservoir of oil and means actuated by vacuum in the vacuum chamber to draw oil from the reservoir into the pump, a first conduit means communicating with the pressure chamber and a second conduit means communicating with the vacuum chamber, in which respectively a flow of air under pressure or a flow of air under vacuum may be supplied by the unit; and air flow restriction means constructed to be mounted in the line of flow of air in the second conduit means when the unit is supplying air under pressure to cause a limited degree of vacuum to develop in the vacuum chamber to actuate the vacuum actuated means.

ERVIN J. OSTERHUS.

REFERENCES CITED

The following references are of record in the file of this patent:

UNITED STATES PATENTS

| Number | Name | Date |
|---|---|---|
| 275,667 | Jones | Apr. 10, 1883 |
| 367,726 | Penney | Aug. 2, 1887 |
| 1,142,544 | Vernon et al. | June 8, 1915 |
| 1,408,649 | Shore | Mar. 7, 1922 |
| 1,610,503 | Fitts | Dec. 14, 1926 |
| 1,673,191 | Gille | June 12, 1928 |
| 1,927,931 | Farmer | Sept. 26, 1933 |
| 2,018,341 | Badger | Oct. 22, 1935 |
| 2,070,151 | Westin | Feb. 9, 1937 |
| 2,272,926 | Squiller | Feb. 10, 1942 |